(12) United States Patent
Marchetti et al.

(10) Patent No.: US 9,415,921 B2
(45) Date of Patent: Aug. 16, 2016

(54) APPARATUS, SYSTEMS AND METHODS FOR PACKAGING ELECTRONIC PRODUCTS

(71) Applicant: New Concepts Development Corp., Woodstock, IL (US)

(72) Inventors: Joseph L. Marchetti, Lake in the Hills, IL (US); Ryan O'Connor, Crystal Lake, IL (US)

(73) Assignee: New Concepts Development Corp., Woodstock, IL (US)

( * ) Notice: Subject to any disclaimer, the term of this patent is extended or adjusted under 35 U.S.C. 154(b) by 0 days.

(21) Appl. No.: 13/955,504

(22) Filed: Jul. 31, 2013

(65) Prior Publication Data
US 2014/0027337 A1 Jan. 30, 2014

Related U.S. Application Data

(63) Continuation of application No. 29/420,069, filed on May 4, 2012, now Pat. No. Des. 702,126.

(51) Int. Cl.
*B65D 81/05* (2006.01)
*B65B 5/04* (2006.01)
*B65D 81/113* (2006.01)

(52) U.S. Cl.
CPC . *B65D 81/05* (2013.01); *B65B 5/04* (2013.01); *B65D 81/113* (2013.01); *Y02W 90/13* (2013.01)

(58) Field of Classification Search
CPC .................................. B65D 81/06; B65B 5/04
USPC ......... 206/523, 521, 586, 453, 454, 591, 592, 206/593, 588
See application file for complete search history.

(56) References Cited

U.S. PATENT DOCUMENTS

| | | | | |
|---|---|---|---|---|
| 5,127,526 A * | 7/1992 | Vigue | ........................... | 206/587 |
| 5,259,508 A * | 11/1993 | Beckerman | ................... | 206/587 |
| 5,385,232 A * | 1/1995 | Foos et al. | ...................... | 206/320 |
| 5,706,951 A * | 1/1998 | Oinuma et al. | ............... | 206/710 |
| 5,715,940 A * | 2/1998 | Son | ............................... | 206/320 |
| 5,779,045 A * | 7/1998 | Yu | ................................. | 206/320 |
| 6,105,765 A * | 8/2000 | Chu | .............................. | 206/320 |
| RE37,253 E * | 7/2001 | Moren et al. | .................. | 206/586 |
| 6,268,039 B1 * | 7/2001 | Chou et al. | .................... | 428/122 |
| 6,820,743 B2 * | 11/2004 | Hurley et al. | .................. | 206/427 |
| 7,044,303 B2 * | 5/2006 | Van Der Werf | ............... | 206/586 |
| 7,584,852 B2 * | 9/2009 | O'Brien et al. | ............... | 206/591 |
| 8,047,370 B2 * | 11/2011 | Ma et al. | ....................... | 206/521 |
| 8,439,197 B2 * | 5/2013 | Yajima et al. | ................. | 206/454 |
| 2001/0020595 A1 * | 9/2001 | Koike | ............................ | 206/521 |
| 2004/0031711 A1 * | 2/2004 | O'Malley | ...................... | 206/427 |
| 2004/0094448 A1 * | 5/2004 | Koike | ............................ | 206/521 |
| 2007/0175779 A1 * | 8/2007 | Imai | ............................ | 206/308.3 |
| 2010/0251940 A1 * | 10/2010 | Jones et al. | ................... | 108/53.3 |

* cited by examiner

*Primary Examiner* — Steven A. Reynolds
(74) *Attorney, Agent, or Firm* — Scherrer Patent & Trademark Law, P.C.; Stephen T. Scherrer; Monique A. Morneault

(57) ABSTRACT

The present invention relates to product packaging for electronic products. Specifically, the present invention relates to apparatus, systems and methods for packaging electronic products, comprising a first portion and a second portion, wherein when the first portion and the second portion are oriented in a first configuration, they form a first enclosing structure for a product, such as a first electronic product, and further wherein the first portion and the second portion, when oriented in a second configuration, form a second enclosing structure for a product, such as a second electronic product having a different shape or size from the first electronic product.

10 Claims, 4 Drawing Sheets

APPARATUS, SYSTEMS AND METHODS FOR PACKAGING ELECTRONIC PRODUCTS

The present invention claims priority as a continuation of U.S. Design patent application Ser. No. 29/420,069, entitled "Hard Drive Cushion Made From Biodegradable, Recycled Paper Pulp," filed May 4, 2012, which incorporates by reference the entirety of U.S. Provisional Patent Application No. 61/638,762, entitled "Apparatus, Systems and Methods for Packaging Electronic Products," filed Apr. 26, 2012, each of which is expressly incorporated herein by reference in its entirety.

TECHNICAL FIELD

The present invention relates to product packaging for electronic products. Specifically, the present invention relates to apparatus, systems and methods for packaging electronic products, comprising a first portion and a second portion, wherein when the first portion and the second portion are oriented in a first configuration, they form a first enclosing structure for a product, such as a first electronic product, and further wherein the first portion and the second portion, when oriented in a second configuration, form a second enclosing structure for a product, such as a second electronic product having a different shape or size from the first electronic product.

BACKGROUND

It is, of course, generally known to package products for shipment thereof. Indeed, many products, especially electronic products, are manufactured far from where they are typically ultimately purchased and used by consumers. In the United States, it is common for many electronic products to be manufactured in Japan or China and then shipped thousands of miles to the United States for purchasing and use by consumers.

For example, computers utilize hard drives for storage of information thereon. Most, if not all, computers require a hard drive storage medium as an integral component of the computer. In many cases, however, hard drives are components that are relatively standardized, in that they can be added to computers or swapped between computers because most computers have standardized connections to accept the hard drives therein. Therefore, hard drives are typically manufactured and shipped separately from other components and the computers themselves. Of course, many other electronic components have similar properties, in that they may be manufactured and shipped separately from other components.

Generally, hard drives, and other similar electronic components, may be manufactured in various sizes. For example, the vast majority of hard drives utilized in computers are of two varieties, based on size: 2.5 inch hard drives and 3.5 inch hard drives. It is very typical for a manufacturing facility to manufacture both 2.5 inch hard drives and 3.5 inch hard drives.

After a hard drive is manufactured, whether a 2.5 inch hard drive or a 3.5 inch hard drive, they may be shipped from the manufacturing facility to another facility for incorporating into a computer or for selling singly to consumers. To ship these components, special packaging has developed to substantially reduce the stress that may be placed upon the components during shipment thereof. For example, during shipment, a box containing a component may be subjected to blows, vibrations, compression stresses, and other like stressors.

Electronic components tend to be fragile, in that physical stresses may cause the electronic components to be non-functional upon arrival after a shipment. Specifically, typical hard drives contain many moving parts, such as a rotating disc containing electronically stored information thereon. Of course, a manufacturer desires to ensure that relatively fragile electronic components safely arrive at their destinations with minimal damage.

To protect relatively fragile electronic components from the rigors of shipping and/or storing, packaging has been developed that create a suspension system for the electronic components within a box for shipment. Typically, an electronic component may be sandwiched between one or more pieces of suspension material, such as, typically, plastic, that may be formed to accept one or more portions of the electronic component. The one or more pieces of the suspension material typically fit snugly within an appropriately sized box made of, typically, cardboard material. The one or more pieces of cardboard material generally allow the electronic component or components to be suspended within the box, whereby the box and the one or more pieces of suspension material absorb much of the shock exerted onto the box during the shipping and/or storing process.

For example, a relatively fragile electronic component, such as a hard drive, may be suspended between two similar or identical pieces of suspension material, typically made of thin plastic or foamed plastic material, such as Styrofoam®. The pieces of suspension material act as stabilizers for the relatively fragile electronic component, and for box contacting surfaces allowing the pieces of suspension material, having the electronic component disposed therebetween, to fit snugly within the box. Therefore, neither the pieces of suspension material, nor the electronic component disposed therebetween, move independently of the box within which they reside for shipping or storing.

However, it is common that different sized or shaped electronic components require the use of different pieces of suspension material in order to allow the electronic components to fit therein. Thus, a manufacturer must typically have many different types and sizes of suspension material to ship the different types and sizes of electronic components. For example, a manufacturer typically requires to have, on hand, a first type or size of suspension material for fitting 2.5 inch hard drives, and a second type or size of suspension material for fitting 3.5 inch hard drives. Generally, the first type or size of suspension material for the 2.5 inch hard drives do not fit the 3.5 inch hard drives, and the second type or size of suspension material for the 3.5 inch hard drives do not fit the 2.5 inch hard drives. Thus, separate supplies of suspension material must be provided to shippers of the different sizes of hard drives based on their needs.

A need, therefore, exists for apparatus, systems and methods for packaging electronic products. Specifically, a need exists for apparatus, systems and methods for packaging electronic products that allow the electronic components to be packaged using suspension material that may be utilized for two or more electronic components having different shapes and/or sizes.

Moreover, a need exists for apparatus, systems and methods for packaging electronic products that may sufficiently absorb shocks and other stresses that would otherwise be imparted to the electronic products. A need further exists for apparatus, systems and methods for packaging electronic products that may be sufficiently sized to be snugly fit within a box for shipping.

Further, a need exists for apparatus, systems and methods for packaging electronic products that may be easily and cost-effectively constructed from recycled and/or recyclable materials. Still further, a need exists for apparatus, systems and methods for packaging electronic products that may sufficiently enclose and protect two or more different sized and/or shaped products for shipment and/or storing thereof.

Moreover, a need exists for apparatus, systems and methods for packaging electronic products that make more efficient the supply chain demands and reduces overhead by reducing the separate packaging necessary for two different items by consolidating the packaging needs into a single packaging solution.

SUMMARY OF THE INVENTION

The present invention relates to product packaging for electronic products. Specifically, the present invention relates to apparatus, systems and methods for packaging electronic products, comprising a first portion and a second portion, wherein when the first portion and the second portion are oriented in a first configuration, they form a first enclosing structure for a product, such as a first electronic product, and further wherein the first portion and the second portion, when oriented in a second configuration, form a second enclosing structure for a product, such as a second electronic product having a different shape or size from the first electronic product.

To this end, in an embodiment of the present invention, an apparatus is provided. The apparatus comprises a first surface and a second surface, wherein the first surface fits a first electronic component having a first shape or size, and the second surface fits a second electronic component having a second shape or size.

Moreover, in an embodiment of the present invention, a system is provided. The system comprise a first apparatus comprising a first surface and a second surface, wherein the first surface fits a first electronic component having a first shape or size and the second surface fits a second electronic component having a second shape or size; and a second apparatus comprising a first surface and a second surface, wherein the first surface fits the first electronic component having the first shape or size and the second surface fits the second electronic component having the second shape or size, wherein the first apparatus and the second apparatus cooperatively form a first enclosure in a first configuration for holding the first electronic component therein and further wherein the first and the second apparatus cooperatively form a second enclosure in a second configuration for holding the second electronic component therein.

It is, therefore, an advantage and objective of the present invention to provide apparatus, systems and methods for packaging electronic products.

Specifically, it is an advantage and objective of the present invention to provide apparatus, systems and methods for packaging electronic products that allow the electronic components to be packaged using suspension material that may be utilized for two or more electronic components having different shapes and/or sizes.

Moreover, it is an advantage and objective of the present invention to provide apparatus, systems and methods for packaging electronic products that may sufficiently absorb shocks and other stresses that would otherwise be imparted to the electronic products.

It is a further advantage and objective of the present invention to provide apparatus, systems and methods for packaging electronic products that may be sufficiently sizes to be snugly fit within a box for shipping.

Further, it is an advantage and an objective of the present invention to provide apparatus, systems and methods for packaging electronic products that may be easily and cost-effectively constructed from recycled and/or recyclable materials.

Still further, it is an advantage and objective of the present invention to provide apparatus, systems and methods for packaging electronic products that may sufficiently enclose and protect two or more different sized and/or shaped products for shipment and/or storing thereof.

Moreover, it is an advantage and objective of the present invention to provide apparatus, systems and methods for packaging electronic products that make more efficient the supply chain demands and reduces overhead by reducing the separate packaging necessary for two different items by consolidating the packaging needs into a single packaging solution.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to product packaging for electronic products. Specifically, the present invention relates to apparatus, systems and methods for packaging electronic products, including a first portion and a second portion, wherein when the first portion and the second portion are oriented in a first configuration, they form a first enclosing structure for a product, such as a first electronic product, and further wherein the first portion and the second portion, when oriented in a second configuration, form a second enclosing structure for a product, such as a second electronic product having a different shape or size from the first electronic product.

Figure 1:
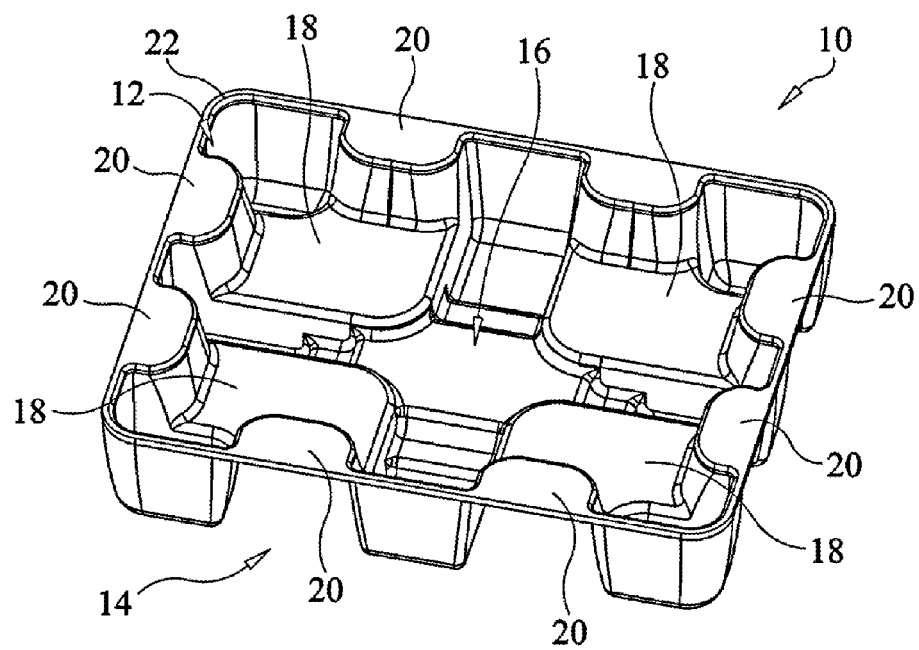
FIG. 1 illustrates a perspective view of a first side of an apparatus for holding at least two different electronic components in alternate configurations in an embodiment of the present invention.

Now referring to the figures, wherein like numerals refer to like parts, FIG. 1 illustrates an apparatus 10 in an embodiment of the present invention. The apparatus 10 comprises a first side 12 and a second side 14. Within the first side 12 of the apparatus 10 may be a first space 16 that may be bounded by a plurality of ribs 18 within the first side 12 of the apparatus 10, the ribs 18 forming the first space 16. An edge 22 may be disposed around the perimeter of the apparatus 10. The ribs 18 may terminate at various locations to form surfaces 20 in and around the first side 12. Generally, the combination of the first side 12, the ribs 18, the surfaces 20 and the edge 22 may cooperate to form the first space 16 that may act as a tray that may be hold a first electronic component, as described in more detail below.

Figure 2:
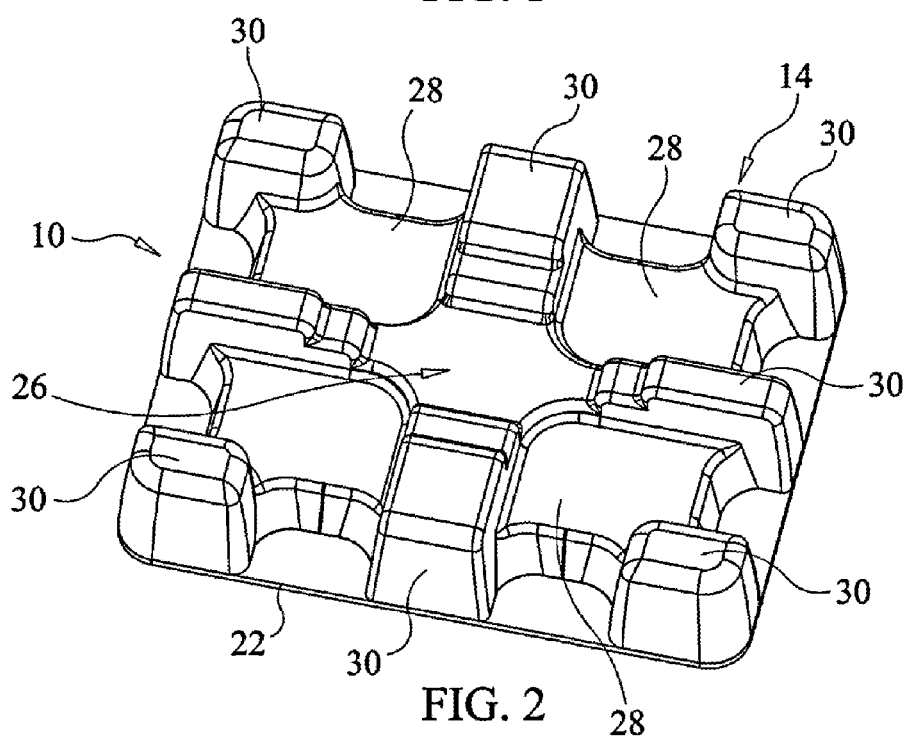
FIG. 2 illustrates a perspective view of a second side of an apparatus for holding at least two different electronic components in alternate configurations in an embodiment of the present invention.

FIG. 2 illustrates the second side 14 of the apparatus 10. As with the first surface 12, the second surface 14 may include a second space 26 disposed within the second surface 14. Moreover, the space 26 may be bounded by a plurality of ribs 28 disposed within the second side 14 of the apparatus 10. The ribs 26 may be reverse impressions of the ribs 18 that may be disposed within the first side 12 of the apparatus 10. The ribs 28 may terminate at various locations to form surfaces 30 in and around the second side 14 of the apparatus 10. The edge 22 may also form a part of the second side 12. Generally, the combination of the second side 14, the ribs 28, the surfaces 30 and the edge 22 may cooperate to form the second space 26 that may act as a tray that may hold a second electronic component, as described in more detail below.

The apparatus 10, in an embodiment of the present invention, may be made from any material apparent to one of ordinary skill in the art. In a particularly preferred embodiment, the apparatus 10, as disclosed herein, may be made from a biodegradable material, such as recycled paper pulp, that provide a sufficient thickness and cushioning effect to the electronic components that may be held thereby for shipping and/or storing of the same.

It should be noted that, generally, the first and second electronic components may be different in size and/or shape. Thus, the apparatus 10 may be utilized to hold two different electronic components, depending on its configuration and orientation, as detailed below.

Figure 3:
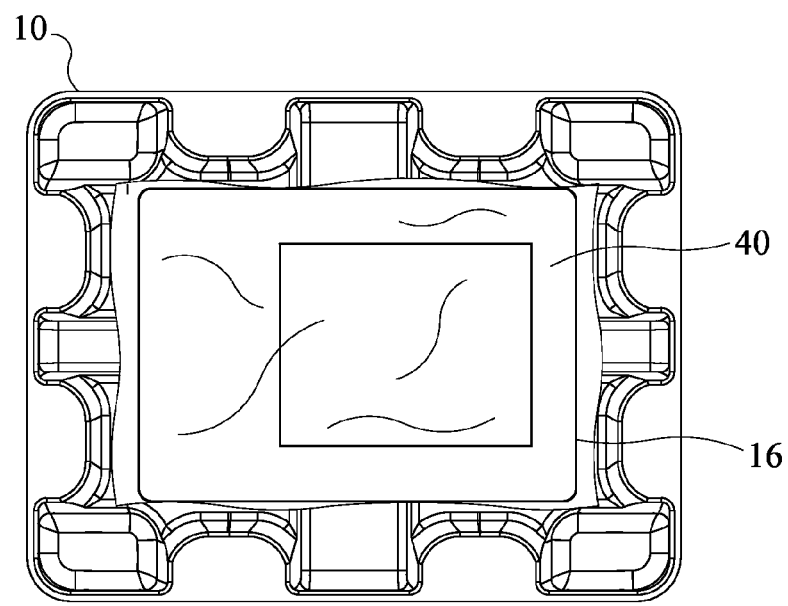
FIG. 3 illustrates a top view of an apparatus holding an electronic component in an embodiment of the present invention.

FIG. 3 illustrates an apparatus 10 in a first configuration and orientation of the apparatus 10 of the present invention having a first electronic component 40 contained therein. Specifically, the first electronic component 40 may fit within the space 16 formed by the cooperation of the ribs 18, the surfaces 20 and the edge 22 within the first side 12 of the apparatus 10. In a preferred embodiment, the first electronic component 40 may fit snugly within the space 16 formed in the first side 12. Moreover, the surfaces of the apparatus 10, as shown and described herein, may be smooth or textured, or may be a combination of smooth and textured, for the purpose of better holding the electronic components therein. For example, the first side 12 may have a texture disposed throughout the first side 12 to better grip and/or hold the first electronic component 40 in the space 16. This may allow the apparatus 10 to better hold the first electronic component 40 therein during shipping and/or storing thereof.

The first electronic component 40 is preferably a hard drive. Specifically, the first electronic component is preferably a 3.5 inch hard drive having a size and a shape to fit snugly within the space 16, as described herein. Generally, the 3.5 inch hard drive has a relatively symmetrical shape such that a portion of the hard drive 40 that extends upwardly away from the apparatus 10 as shown in FIG. 3 may be relatively similar or the same as the portion of the hard drive 40 that extends and fits snugly within the space 16, as illustrated in FIG. 3.

Figure 4:
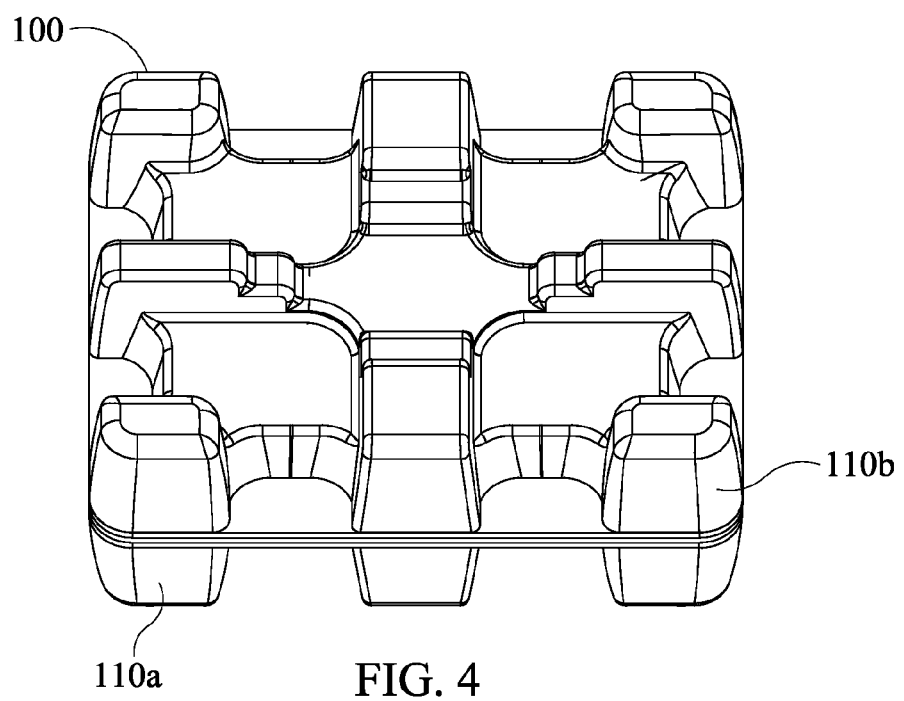
FIG. 4 illustrates a perspective view of a system for holding an electronic component in a first configuration in an embodiment of the present invention.
Figure 5:
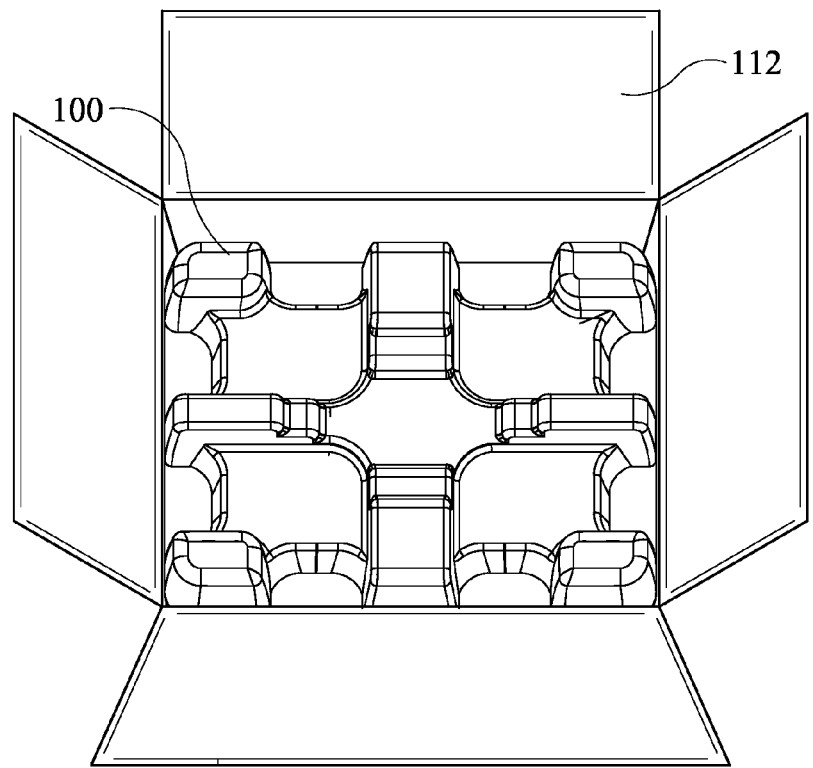
FIG. 5 illustrates a perspective view of a system for holding an electronic component within a shipping box in an embodiment of the present invention.

Thus, FIG. 4 illustrates a system 100 of two identical apparatuses 110a and 110b in a configuration allowing the hard drive to fit within the spaces 16 of the two apparatuses 110a, 110b as the two apparatuses 110a, 110b are disposed in a clamshell orientation with the hard drive disposed therebetween. The apparatus 110a, 110b may be substantially similar, if not identical, to the apparatus 10 disclosed and described herein. Therefore, the portion of the hard drive 40 extending upwardly away from the apparatus 10, as shown in FIG. 3, may fit within the space (not shown) within the apparatus 110b. The clamshell configuration provides stability and protection for the electronic component disposed therein during shipment and/or storage thereof. Indeed, FIG. 5 illustrates the system 100 disposed within a cardboard box 112 for shipping and/or storing of the same. The system 100 protects the electronic component from shocks and stresses that may occur during shipment and/or storage thereof.

Figure 6:
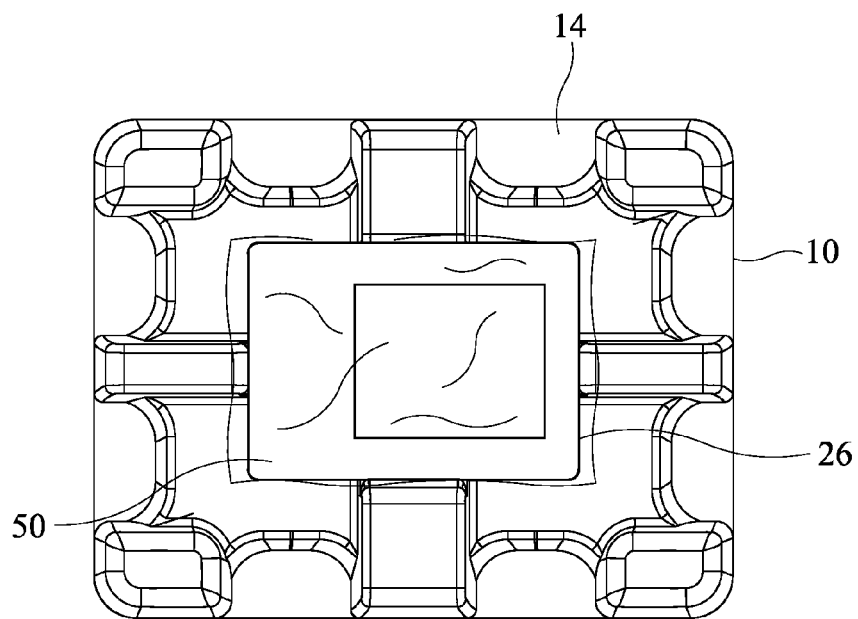
FIG. 6 illustrates a perspective view of an apparatus holding an electronic component in an embodiment of the present invention.

FIG. 6 illustrates an alternate configuration of the apparatus 10 having a second electronic component 50 disposed therein. Specifically, the second electronic component 50 may fit within the space 26 in the second side 14 of the apparatus 10. The second electronic component 50 may be of a different size and/or shape then the first electronic component 40. For example, the second electronic component 50 may be a 2.5 inch hard drive which has a similar shape to the 3.5 inch hard drive, described above, but may be smaller in shape. Therefore, the 2.5 inch hard drive would not be suitable for fitting within the space 16 within the first side 12 of the apparatus 10 because the 2.5 inch hard drive would not fit snugly within the space 16 and, therefore, may move or be jostled during shipment or storage thereof, potentially causing damage to the 2.5 inch hard drive.

Specifically, the second electronic component 50 may fit within the space 26 formed by the cooperation of the ribs 28, the surfaces 30 and the edge 22 within the second side 14 of the apparatus 10. In a preferred embodiment, the first electronic component 50 may fit snugly within the space 26 formed in the second side 14. Moreover, the surfaces of the apparatus 10, as shown and described herein, may be smooth or textured, or may be a combination of smooth and textured, for the purpose of better holding the electronic components therein. For example, the second side 14 may have a texture disposed throughout the second side 14 to better grip and/or hold the first electronic component 50 in the space 26. This may allow the apparatus 10 to better hold the first electronic component 50 therein during shipping and/or storing thereof.

As noted, preferably the second electronic component 50 is a hard drive. Specifically, the second electronic component 50 is preferably a 2.5 inch hard drive having a size and a shape to fit snugly within the space 26, as described herein. Generally, the 2.5 inch hard drive has a relatively symmetrical shape such that a portion of the hard drive 50 that extends upwardly away from the apparatus 10 may be relatively similar or the same as the portion of the hard drive 50 that extends and fits snugly within the space 26, as illustrated in FIG. 3.

Figure 7:
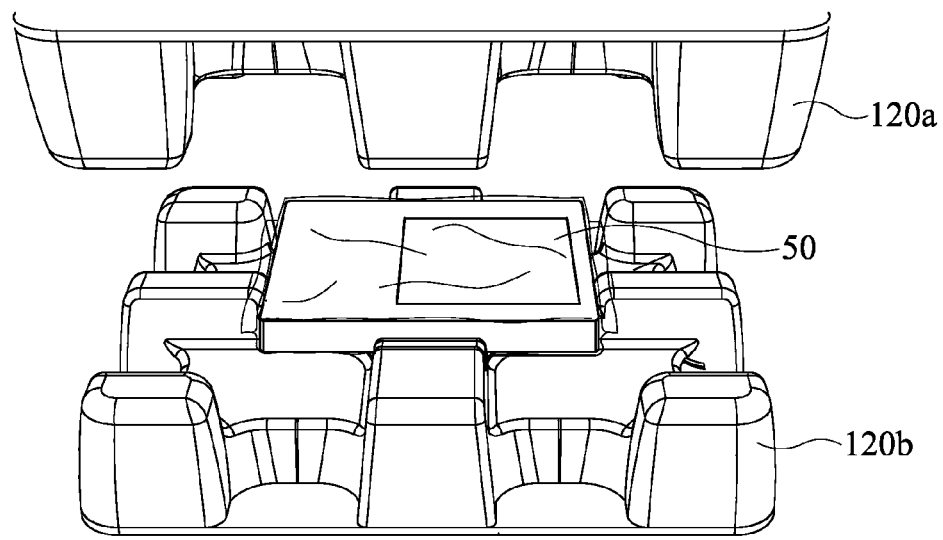
FIG. 7 illustrates a front perspective view of a pair of apparatuses of the present invention being disposed on an electrical component.
Figure 8:
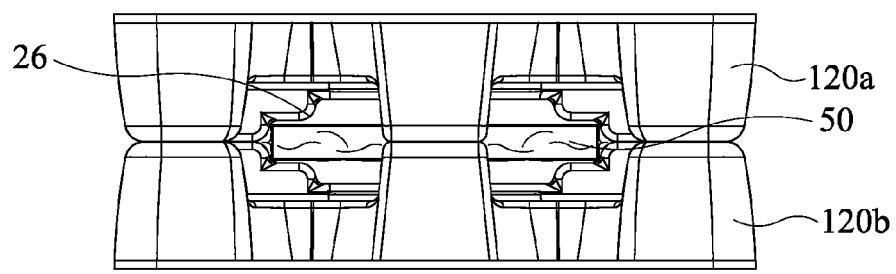
FIG. 8 illustrates a front view of a pair of apparatuses of the present invention sandwiching an electronic component in an embodiment of the present invention.

In an embodiment of the present invention, as illustrated in FIG. 7, a first apparatus 120a, which is substantially similar if not identical to the apparatus 10, as described above, may be disposed above the electronic component 50 and a second apparatus 120b, which is substantially similar if not identical to the apparatus 10, as described above, may be disposed beneath the electronic component 50, thereby allowing the electronic component 50 to be sandwiched by the first and second apparatuses 120a, 120b, and disposed within the space 26 that may form between the first and second apparatuses 120a, 120b, as shown in FIG. 8. The sandwiching of the electronic component 50 by the first and second apparatuses 120a, 120b may be disposed snugly within a box (not shown) for shipment or storage thereof, thereby protecting the electronic component 50.

Thus, the apparatus 10, as disclosed herein, may be utilized together with another apparatus 10 to form a space for holding a first electronic component (as illustrated in FIG. 4) when disposed in a first configuration, with the two apparatuses disposed in face-to-face relationship. The apparatus 10 may also be utilized together with another apparatus 10 to form a space for holding a different electronic component of a different shape and/or size than the first electronic component, when the two apparatuses are disposed in back-to-back relationship.

Therefore, manufacturing of the apparatus 10 for purposes of holding two differently sized and/or shaped electronic components may be made simpler because only copies of one type of apparatus need be manufactured to hold, store, cushion and/or protect a plurality of differently sized and/or shaped electronic components.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. An apparatus for holding and storing electronic components comprising:
    a surface configured to hold electronic components on a first side and a second side;
    a first axis running longitudinally through the surface;
    a second axis running laterally through the surface, wherein the first axis and the second axis are perpendicular to each other;
    the first side of the surface having a first plurality of ribs forming a first space, wherein the first surface is symmetrical along both of the first and second axes and is configured to fit a 3.5 inch hard drive within the first space formed by the first plurality of ribs; and
    the second side of the surface having a second plurality of ribs forming a second space, wherein the second surface is symmetrical along both of the first and second axes and fits a 2.5 inch hard drive within the second space formed by the second plurality of ribs;
    wherein the first space in the first surface forms the second plurality of ribs on the second surface and the second space in the second surface forms the first plurality of ribs on the first surface.

2. The apparatus of claim 1, wherein the apparatus is made from recycled materials.

3. The apparatus of claim 1 wherein the second side is a reverse impression of the first side.

4. The apparatus of claim 1 wherein the first side and the second side are textured.

5. A system for holding and storing electronic components comprising:
    a first apparatus having a surface with a first side and a second side, and a first axis running longitudinally through the surface of the first apparatus and a second axis running laterally through the surface of the first apparatus, wherein the first and second axes of the first apparatus are perpendicular to each other, wherein the first side of the surface of the first apparatus is symmetrical along both of the first and second axes of the first apparatus and is configured to fit a first electronic component having a first shape and size in a first space of the first apparatus and the second side of the surface of the first apparatus is symmetrical along both of the first and second axes of the first apparatus and is configured to fit a second electronic component having a second shape and size in a second space of the first apparatus; and
    a second apparatus having a surface with a first side and a second side, and a first axis running longitudinally through the surface of the second apparatus and a second axis running laterally through the surface of the apparatus, wherein the first and second axes of the second apparatus are perpendicular to each other, wherein the first side of the surface of the second apparatus is symmetrical along both of the first and second axes of the second apparatus and is configured to fit the first electronic component having the first shape and size in a first space of the second apparatus and the second side of the surface of the second apparatus is symmetrical along both of the first and second axes of the second apparatus and is configured to fit the second electronic component having the second shape and size in a second space of the second apparatus;
    wherein the first apparatus and the second apparatus are identical
    wherein the first apparatus and the second apparatus cooperatively form a first enclosure configured to hold the first electronic device in a first configuration when the first side of the first apparatus and the second side of the second apparatus are aligned in face-to-face relation, and further wherein the first apparatus and the second apparatus cooperatively form a second enclosure configured to hold the second electronic device in a second configuration when the second side of the first apparatus and the second side of the second apparatus are aligned in face-to-face relation.

6. The system of claim 5 wherein the first configuration is a clamshell configuration.

7. The system of claim 5 wherein the second configuration is a sandwich configuration.

8. The system of claim 5 wherein the first sides and the second sides of the first apparatus and the second apparatus are formed by a plurality of ribs.

9. The system of claim 5 wherein the second side of the first apparatus is a reverse impression of the first side of the first apparatus and the second side of the second apparatus is a reverse impression of the first side of the second apparatus.

10. The system of claim 5 wherein the first sides and the second sides of the first apparatus and the second apparatus are textured.

* * * * *